J. A. Perley,

Spoke Shave.

No. 97,802. Patented Dec. 14, 1869.

Witnesses
S. N. Piper
J. A. Snow

Joseph. A. Perley.
by his attorney
R. H. Eddy

United States Patent Office.

JOSEPH A. PERLEY, OF LYNN, MASSACHUSETTS, ASSIGNOR TO HIMSELF AND WILLIAM H. PERLEY, OF SAME PLACE.

Letters Patent No. 97,802, dated December 14, 1869.

IMPROVEMENT IN SPOKE-SHAVE.

The Schedule referred to in these Letters Patent and making part of the same.

To all persons to whom these presents may come:

Be it known that I, JOSEPH A. PERLEY, of Lynn, of the county of Essex, and State of Massachusetts, have made a new and useful invention, having reference to Spoke and Heel-Shaves; and I do hereby declare the same to be fully described in the following specification, and represented in the accompanying drawings, of which—

Figure 1:
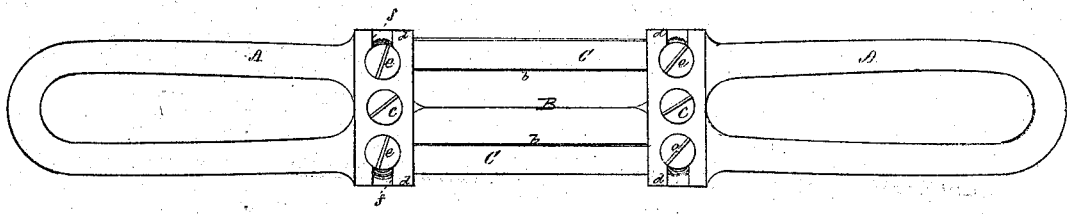
Figure 2:
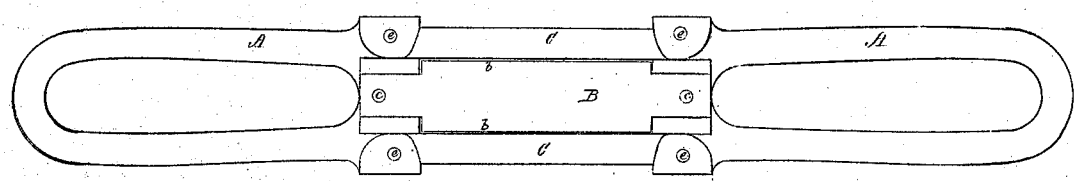
Figure 3:
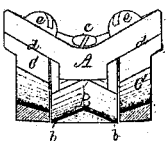

Figure 1 is a top view,
Figure 2 a bottom view, and
Figure 3, a transverse section of a heel-shave, as provided with my invention, which consists in the combination and arrangement of a double-edged or duplex knife, two adjustable throat-pieces, and the two handles, the whole being substantially as hereinafter explained, and also as exhibited in the said drawings.

In such drawings—

A A denotes the two handles of the implement.

The duplex knife, shown at B, has two cutting-edges, arranged as shown at $b\ b$, it being fastened, by means of screws $c\ c$, to the handles A A, so as to form with them a stock.

Each of these handles is shaped or provided with inclined beds $d\ d$ at its inner part, to receive and give support to the next adjacent ends or parts of two movable bars or throat-pieces, C C, which are fastened to the handles by clamp-screws $e\ e\ e\ e$, that screw into the throat-pieces, and pass through slots $f\ f\ f\ f$, made in the handles transversely thereof.

With the double-edged knife, and the handles and two throat-pieces constructed and combined or arranged as represented, one of the knife-edges, with its throat-piece, may be adjusted to make a "fine cut," and the other knife-edge and throat-piece may be arranged to make a coarser or coarse cut, the same admitting of the implement being used both for paring down, or rough cutting and for finishing a heel, a work usually accomplished heretofore by two separate shaves or implements.

I claim the combination of the two handles, the double-edged knife, and the two throat-pieces, substantially in manner as specified.

JOSEPH A. PERLEY.

Witnesses:
R. H. EDDY,
S. N. PIPER.